T. L. R. D'ORVILLE.
FUEL SUPPLY SYSTEM FOR INTERNAL COMBUSTION ENGINES.
APPLICATION FILED JULY 24, 1917.

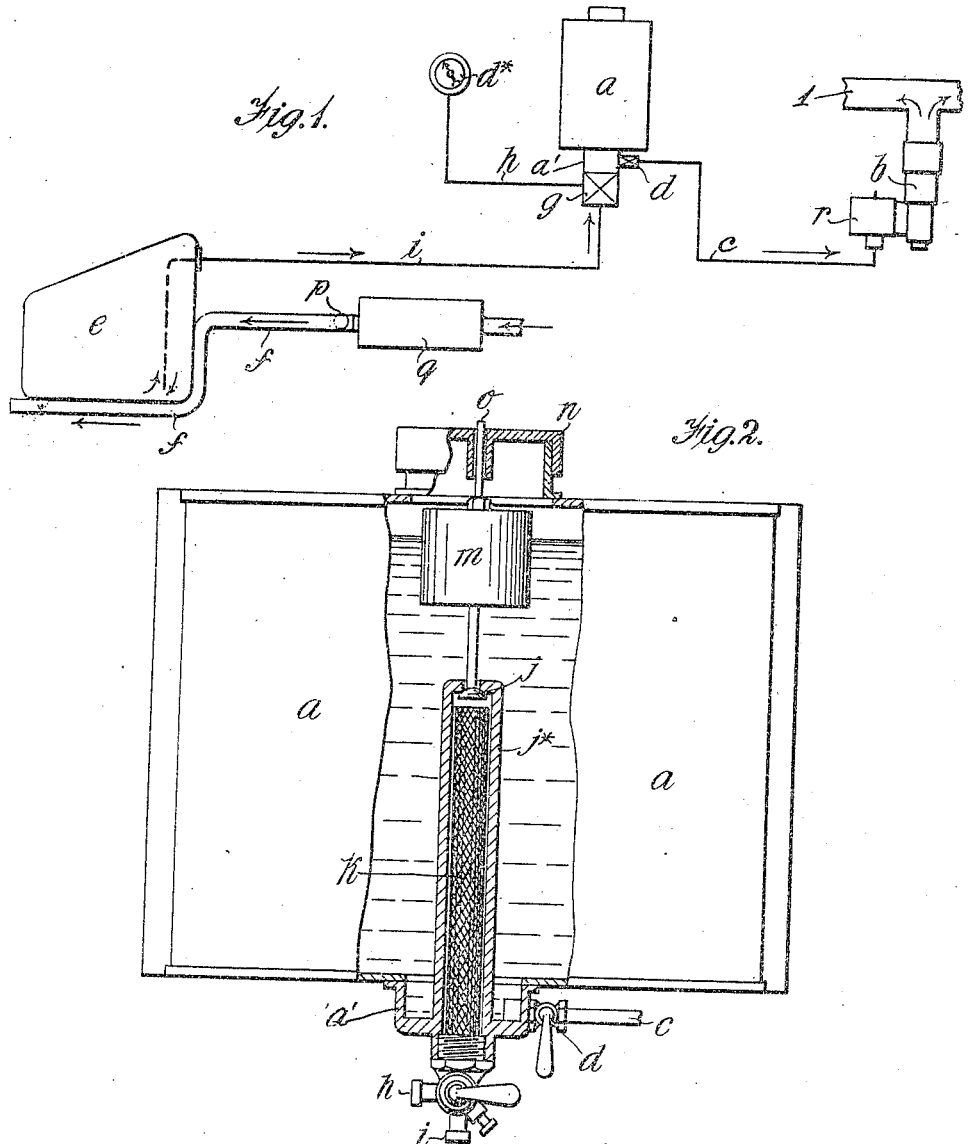

1,266,429.

Patented May 14, 1918.
2 SHEETS—SHEET 2.

INVENTOR
THEODORE LIVINUS
REEPMAKER d'ORVILLE
By
Attorney

UNITED STATES PATENT OFFICE.

THEODORE LIVINUS REEPMAKER D'ORVILLE, OF TWICKENHAM, ENGLAND.

FUEL-SUPPLY SYSTEM FOR INTERNAL-COMBUSTION ENGINES.

1,266,429.                 Specification of Letters Patent.    Patented May 14, 1918.

Application filed July 24, 1917. Serial No. 182,594.

*To all whom it may concern:*

Be it known that I, THEODORE LIVINUS REEPMAKER D'ORVILLE, a subject of the Queen of Holland, and resident of Twickenham, county of Middlesex, England, have invented a certain new and useful Improvement in Fuel-Supply Systems for Internal-Combustion Engines, of which the following is a specification.

The present invention relates to an improvement in fuel supplying means for internal combustion engines.

To this end it is contemplated to provide novel means for controlling and regulating the fuel supply by combined pressure and gravity feed devices which are entirely automatic in their action, and of course, require no hand pump when starting to prime the carbureter or gravity tank. In this connection it is proposed to provide a novel arrangement of fuel storage and gravity feed tanks, whereby the former is located below the carbureter of the engine while the latter is of course located above the same, whereby the said main storage tank may be conveniently heated by the exhaust from the engine to create sufficient pressure therein to supply the gravity feed tank.

A further object of the invention is to provide a novel gravity feed tank which is connected with the main fuel storage tank in such a manner that the amount of fuel supplied thereto may be readily controlled by means of a special form of valve, which in addition to performing this function also provides for conveniently utilizing a pressure gage to determine the condition of gravity feed tank, and also draw off fuel therefrom when necessary.

With the above and other objects in view, which will more readily appear as the nature of the invention is better understood, the same consists in the novel construction, combination, and arrangement of parts hereinafter more fully described illustrated and claimed.

A preferred and practical embodiment of the invention is shown in the accompanying drawings.

Figure 1 is a diagrammatic view illustrating the general position and arrangement of the main fuel storage tank and gravity feed tank with reference to the carbureter, and also showing one arrangement for heating the main storage tank.

Fig. 2 is an enlarged detail view partly in section of the gravity feed tank.

Similar reference characters designate corresponding parts throughout the several figures of the drawings.

Figure 3:
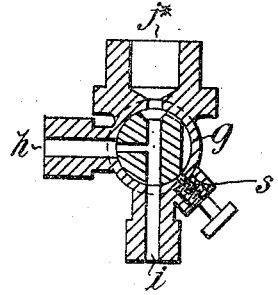
Fig. 3 is an enlarged vertical sectional view of the three-way valve interposed between the main storage and gravity feed tanks.

In carrying the present invention into effect, it is proposed to utilize a minimum amount of piping, and otherwise secure simplicity of arrangement and detail, whereby the maximum efficiency under all conditions may be readily maintained. Accordingly, with this end in view, it will be observed by reference to Fig. 1, wherein the reference character 1 represents the intake manifold of the internal combustion engine and $b$ the carbureter therefor, that the bowl $r$ of the latter is connected by means of a pipe $c$ with the outlet bowl portion $a'$ of an auxiliary fuel supply or gravity feed tank $a$, and as shown, the said pipe $c$ may be provided with a turn plug $d$ for completely shutting off the supply of fuel from the feed tank to the carbureter, which is frequently desirable, as when stopping, etc.

The said gravity feed tank $a$, is of course located above the level of the carbureter $b$, and receives its supply of fuel from the main storage tank $e$ which may be located at the rear of the car and below the carbureter. The communication between these two tanks is established by means of the pipe line $i$, one end of which is disposed near the bottom of the tank $e$ while the opposite end thereof which connects with the threaded nipple portion of the outlet bowl $a'$ of the tank $a$ is provided with a three-way valve designated generally as $g$, and presently referred to more in detail. As also shown, the main storage tank $e$ is so arranged as to be heated by the exhaust of the engine. That is to say, the exhaust pipe line $f$ from the motor has an extended area of contact with the exterior of the main tank, whereby the heat of the exhaust gases may be imparted thereto to create sufficient pressure therein to force fuel from the said tank through the pipe line $i$ into the gravity feed tank $a$. The exhaust pipe line $f$ is equipped with the usual muffler $q$, and for the purpose of controlling the amount of heat supplied to the end of the pipe which contacts with the tank, a suitable cut-out $p$ is interposed between the muffler and its initial point of contact with the tank.

Referring now more particularly to the gravity feed tank $a$, it will be observed from Fig. 2 that the previously referred to outlet bowl $a'$ is formed by the intermediate cup-like body portion of a combined inlet and discharge member which has a threaded nipple portion at one end for receiving the threaded shank portion of the three-way valve $g$, and also has a tubular filter housing $j^*$ which is adapted to house a suitable filtering medium $k$. The upper end of this tubular portion $j^*$ is closed except for a suitable outlet passage which is formed at its inner ends with a seat for receiving the semispherical surface of a valve head $j$ carried upon a depending stem portion of a float member $m$. This float member carries on its upper face another stem or spindle $o$ which is guided in a suitable air opening in a cap $n$ fitted to an upstanding neck portion secured to the top of the gravity feed tank.

In connection with the three-way cock $g$ shown in Figs. 3 to 6 inclusive of the drawings, it will be seen that four different positions are obtainable, for instance:—

(1) Fig. 3 shows the position of the valve to be such that the main tank $e$ may be connected to the gage $d^*$ through the pipe line $h$ and to the gravity feed tank $a$. This position of the valve represents the normal running position in which the gravity tank may be supplied with fuel from the storage tank and the pressure in the said pressure tank may be indicated on the gage.

Figure 4:
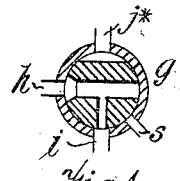
Figs. 4, 5 and 6 are diagrammatic views respectively illustrating the three positions of the valve shown in Fig. 3.

(2) Fig. 4 shows the stopping position. That is to say, when the plug of the valve is in the position shown in this figure the gravity tank $a$ is cut off from the main tank $e$ so that fuel will not flow back by gravity to the main tank, and thus when the engine is started the said gravity tank will be full, and can supply fuel to the carbureter by gravity through valve $d$ and pipe $c$ until the main tank is sufficiently warmed up by exhaust gases and shows sufficient pressure on gage $d^*$ to allow the plug of the valve to be turned to running position.

Figure 5:
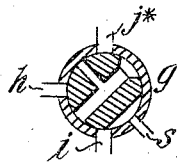
Figure 6:

(3) Fig. 5 shows the position of the valve parts when the gravity feed tank $a$ and gage $d^*$ are cut off from the main tank and the said main tank is put in communication with the outlet nipple $s$. If there is pressure in the tank $e$ fuel may be forced out of the discharge outlet $s$ for cleaning purposes or the like, and if there is no pressure in the tank $e$ the plug may be turned as shown in Fig. 6 wherein the main tank $e$ and gage $d^*$ are cut off and the gravity feed tank $a$ slightly opened to the outlet $s$.

Position 1 also serves as a pressure-release and tell-tale when main tank is empty. When the level of fuel is very low in the main tank, gas will be able to escape by way of pipe leading to the three-way cock, the lower end of said pipe being no longer "sealed" by the liquid. The result will be that the gage hand will immediately commence "trembling" more and more markedly and violently and tend to drop to zero. The driver observing this will at once turn cock from position 1—(Fig. 3 running position) to position 3—(Fig. 5 pressure-release position). In this manner he will prevent fuel in gravity tank $a$ from returning to main tank $e$ and will therefore be able to feed the carbureter $b$ on gravity until he can obtain a fresh supply of fuel, and, secondly, he will at the same time connect main tank $e$ with atmosphere, thus obviating the risk of explosion in the system owing to the pressure rising without adequate pressure-release.

Figure 7:
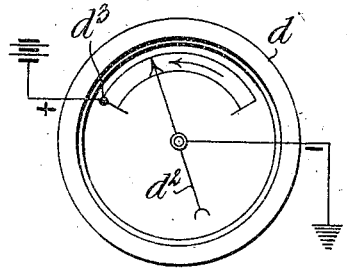
Figs. 7 and 8 are detail views of different types of indicators which may be used to tell the condition of the pressure feed tank.

This valve device therefore warns the driver in proper time to replenish main tank before he allows the fuel supply to be exhausted entirely, without stopping his engine, to continue supplying by gravity the carbureter and simultaneously cutting out pressure system, connecting same to atmosphere to prevent accidents.

Where further refinement of the tell-tale is required, the gage hand $d^2$ of the gage $d^*$—Fig. 7—may be connected to an electric system, said gage hand $d^2$ making contact with an insulated metal pin $d^3$ on dial of gage when it falls to zero, switching on an electric bell or an electric light, or simply actuating an electric horn, in which case an extra switch is required to stop signal; or, a separate device connected to a branch pipe of the gage pipe may be utilized to effect required contact for bell or lamp.

Figure 8:
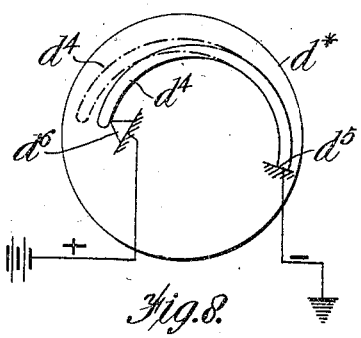

Such a device consists—Fig. 8—of a flattened and bent tube $d^4$ similar to those used in pressure-indicating gages, the fixed end $d^5$ of said tube $d^4$ being connected to fuel pipe system, so that if gas should fill the tube $d^4$ instead of fuel, said tube $d^4$ would alter its curvature, from dotted lines to full lines, and come in contact with the terminal $d^6$ of a positive wire, completing bell and lamp circuit.

Figure 9:
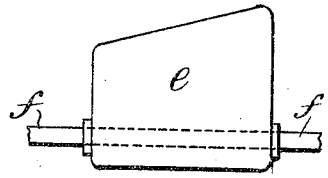
Fig. 9 is a detail view showing modified arrangement for supplying heat to the main fuel storage tank.

In connection with the modified arrangement for heating the main storage tank $e$ shown in Fig. 9 of the drawings, it may be observed that in this instance it is proposed to run the exhaust pipe *f* directly through the tank instead of around the exterior thereof as shown in Fig. 1. Thus, in this way the direct heat of the exhaust is caged within the main tank, and under certain conditions of use may be desirable to produce an augmented pressure within the main tank *e*.

From the foregoing it will be apparent that when it is desired to start the motor, the turn plug *d* may be adjusted so that fuel is supplied by gravity from the tank *a* to the float chamber *r* of the carbureter *b* through the pipe *c*. During this starting operation, the plug of the three-way valve *g* is of course turned to such a position as to cut off communication between the main storage tank *e* and feed tank *a*, but after the engine has started and the heat of the exhaust warms up the main tank *e*, the plug of the valve *g* is turned to the position shown in Fig. 3 whereby the tank *a* may be supplied with fuel from the tank *e*. As the fuel passes through the valve *g* it enters the filter chamber formed by the tubular portion *j\** where it is adequately filtered, and if the position of the float is low enough to cause the valve head *j* to be off its seat, then the fuel will pass from the said filter chamber into the tank proper. From thence it makes its way to the outlet bowl *a'* of the tank and through pipe *c* to float chamber *r* of the carbureter.

I claim—

1. An automatic fuel feeding system for internal combustion engines including in combination with the exhaust pipe and carbureter therefor, a gravity feed tank connected with the carbureter, a main fuel tank located below the level of the carbureter and in contact with the exhaust pipe, and a valved pipe line between said main tank and the gravity feed tank.

2. An automatic fuel feeding system for internal combustion engines including in combination with the exhaust pipe and carbureter therefor, a gravity fuel feeding tank located above the plane of the carbureter, and a fuel storage tank connection with the gravity feed tank and located below the plane of the carbureter and heated from the exhaust pipe to create pressure therein to force fuel therefrom into the gravity feed tank.

3. An automatic fuel feeding system for internal combustion engines including in combination with the exhaust pipe and carbureter therefor, a gravity feed tank connected with the carbureter, a storage tank connected with the gravity feed tank and having a direct contacting engagement with the exhaust pipe.

4. An automatic fuel feeding system for internal combustion engines including in combination with the exhaust pipe and carbureter therefor, a fuel storage tank located below the level of the carbureter and heated by the exhaust pipe, and a fuel feeding tank connected with said storage tank and with the carbureter, and including a filter tube in communication at one end with the pipe leading from the storage tank and having a valve seat at one end, and a float element carrying a valve head for said seat.

5. An automatic fuel feeding system for internal combustion engines including in combination with the exhaust pipe and carbureter therefor, a gravity feed tank connected with the carbureter, a main fuel storage and pressure feed tank heated by the exhaust pipe, a gage, and a three-way valve device located in the line of connection between the storage tank and the feed tank and having a pipe connection with said gage.

6. An automatic fuel feeding system for internal combustion engines including in combination with the exhaust pipe and carbureter therefor, a fuel storage and pressure tank heated by the exhaust pipe, a gravity feed tank having a combined inlet and discharge unit which communicates with the carbureter, and a valved pipe line connection between the storage tank and the said unit of the gravity feed tank.

7. An automatic fuel feeding system for internal combustion engines including in combination with the exhaust pipe and carbureter therefor, a fuel storage and pressure tank heated by the exhaust pipe, a gravity feed tank, a combined inlet and discharge unit for the feed tank consisting of an outlet bowl and a filter tube, a float within the gravity tank and having means for controlling the discharge from said filter tube, and a valved pipe line between said outlet bowl of the said unit of the gravity tank and the carbureter.

8. In a fuel feeding system for internal combustion engines, a gravity tank and combined storage and pressure tank, a pipe connection between said tanks, heating means for the storage tank and a valve in said pipe line, said valve having an outlet connection, and adapted when in one position to establish communication between the pressure tank and the gravity tank, and when in another position to shut off communication between said tanks and place the pressure tank in communication with the atmosphere through the outlet connection.

9. A fuel feeding system for internal combustion engines, including in combination, a gravity feed tank, a fuel storage and pressure tank, heating means for the storage tank, a pipe connection between said tanks, a three-way valve device located in said pipe line and having an outlet connection, a pressure gage having a pipe connection with said valve, and the latter adapted to be adjusted so that when the main and gravity tanks are in communication both of the latter will also be in communication with said gage and the outlet connection will be closed.

10. An automatic fuel feeding system for internal combustion engines including in combination with the carbureter, a gravity feed tank connected with the latter, a storage tank connected with the gravity feed tank, and means supplied from the engine for applying heat to the storage tank.

In testimony whereof I have affixed my signature in presence of two witnesses.

THEODORE LIVINUS REEPMAKER D'ORVILLE.

Witnesses:
    ROBT. HUNTER,
    PERCY M. GOODWIN.